(12) United States Patent
Shizume (10) Patent No.: US 7,437,965 B2
(45) Date of Patent: Oct. 21, 2008

(54) GEAR CHANGE CONTROL DEVICE AND GEAR SHIFT CONTROL METHOD FOR WORK VEHICLE

(75) Inventor: Masaru Shizume, Mooka (JP)

(73) Assignee: Komatsu Ltd., Tokyo (JP)

( * ) Notice: Subject to any disclaimer, the term of this patent is extended or adjusted under 35 U.S.C. 154(b) by 268 days.

(21) Appl. No.: 10/574,077

(22) PCT Filed: Aug. 12, 2005

(86) PCT No.: PCT/JP2005/014852

§ 371 (c)(1),
(2), (4) Date: Mar. 30, 2006

(87) PCT Pub. No.: WO2006/022154

PCT Pub. Date: Mar. 2, 2006

(65) Prior Publication Data

US 2007/0113694 A1 May 24, 2007

(30) Foreign Application Priority Data

Aug. 23, 2004 (JP) .............................. 2004-241998

(51) Int. Cl.
*F16H 3/08* (2006.01)
(52) U.S. Cl. ........................................................ 74/333
(58) Field of Classification Search .................. 74/333, 74/335; 192/3.63, 3.57, 3.58, 3.52
See application file for complete search history.

(56) References Cited

U.S. PATENT DOCUMENTS

| | | | |
|---|---|---|---|
| 3,897,699 A | 8/1975 | Hoyer | |
| 5,035,308 A * | 7/1991 | Baba et al. | 477/62 |
| 5,417,622 A * | 5/1995 | Asayama et al. | 477/63 |
| 5,456,333 A | 10/1995 | Brandt et al. | |
| 5,573,473 A * | 11/1996 | Asayama et al. | 477/63 |
| 6,077,188 A * | 6/2000 | Futamura et al. | 477/65 |
| 6,482,126 B2 * | 11/2002 | Kawaguchi | 477/180 |
| 6,571,654 B2 * | 6/2003 | Forsyth | 74/339 |
| 6,966,805 B1 * | 11/2005 | Caldwell | 440/75 |

(Continued)

FOREIGN PATENT DOCUMENTS

DE 2 244 342 3/1974

(Continued)

OTHER PUBLICATIONS

German Office Action (in English language) issued Aug. 8, 2007.

*Primary Examiner*—Dirk Wright
(74) *Attorney, Agent, or Firm*—Wenderoth, Lind & Ponack, L.L.P.

(57) ABSTRACT

A gear change control device and a method for a work vehicle for reducing a heat quantity generated by gear shift clutches of a transmission and a gear shift shock to reduce a load on the clutches without inducing elongation of a cycle time or deterioration of a work efficiency. A clutch pressure (Pm) of an input clutch (10) is reduced to switch from a connected state to a power-transmittable sliding state at a time (tE) after a time (tA) at which a cut-off operation of a gear shift clutch used before gear shifting (reverse clutch 22) is started and before a time (tD) at which the connecting operation of a selected gear shift clutch to be used after the gear shifting (forward clutch 21) is completed.

11 Claims, 8 Drawing Sheets

U.S. PATENT DOCUMENTS

7,275,455 B2 * 10/2007 Kennedy .................... 74/335

FOREIGN PATENT DOCUMENTS

| JP | 1-303347 | 12/1989 |
| JP | 7-4521 | 1/1995 |
| JP | 2001-146928 | 5/2001 |
| JP | 3354672 | 12/2002 |

* cited by examiner

GEAR CHANGE CONTROL DEVICE AND GEAR SHIFT CONTROL METHOD FOR WORK VEHICLE

TECHNICAL FIELD

The present invention relates to a gear change control device and a gear shift control method applicable to a work vehicle having an input clutch provided between an engine and a transmission.

BACKGROUND ART

A power transmission path for a wheel loader engine is provided with a transmission having a forward clutch and a reverse clutch.

When a forward/reverse switch lever arranged in a driver seat is operated to the forward position while the vehicle is traveling in reverse, for example, a gear shift command is generated to select the forward clutch. Thereby, the transmission is switched from the reverse clutch used before gear shifting to the selected forward clutch to be used after gear shifting, and the engine power is transmitted to the selected forward clutch of the transmission to be used after the gear shifting to drive the drive wheels. Thus, the vehicle is switched over from reverse travel to forward travel.

Wheel loaders are often operated in V-shape driving mode to perform works. The "V-shape driving mode" refers to a driving mode in which a wheel loader is operated to repeatedly travel back and forth along a route, firstly traveling forward to the ground to excavate soil, then traveling in reverse after the excavation until reaching a point to change the direction, and again traveling forward to load the excavated soil on a hopper or a dump truck.

During the operation in the V-shape driving mode, switching from reverse travel to forward travel, or vice versa is performed in a complicated manner.

Switching from reverse travel to forward travel, for example, is carried out, as shown in FIG. 6(a), by reducing the clutch pressure Pt of the reverse clutch from a set pressure P1, and subsequently increasing the clutch pressure Pt of the forward clutch to the set pressure P1.

An input clutch (modulation clutch) is provided between the engine and the transmission on the power transmission path of the wheel loader engine.

This input clutch is provided for adjusting the power transmitted to the traveling power train to increase the power transmitted to the work machine according to the work situation, or to prevent slippage of the vehicle.

Patent Publication 1 specified below describes an invention according to which the degree of engagement of the input clutch is controlled to prevent slippage of the vehicle.

Patent Publication 1: Japanese Patent Application Laid-Open No. 2001-146928

DISCLOSURE OF THE INVENTION

Problems to be Solved by the Invention

While the clutch pressures Pt of both the reverse clutch and the forward clutch are low, as shown in FIG. 6(a), friction members of the clutches slide on each other, resulting in generation of frictional heat. The line m in FIG. 6(c) indicates a heat quantity Q that is generated along with the elapse of time.

Additionally, torque variation occurs when the clutch input side is connected (engaged) with the clutch output side, which will give gear shift shock to the operator or the vehicle body.

Furthermore, the operator often shifts the gear without reducing the vehicle speed or engine speed. This will further increase the load on the clutches.

When a large load is applied to the transmission clutches in every gear shifting, the wear will progress rapidly to shorten the cycle to disassemble the interior of the transmission for replacing the clutches. This will cause more frequent cessation of the work, which will in turn deteriorate the work efficiency. Further, the replacement of the gear shift clutches requires a lot of manhours, and hence a substantial cost. Therefore, there is a demand to decrease the load applied to the gear shift clutches and to eliminate or alleviate the work load of replacing the clutches.

For this purpose, it may be considered to reduce the load applied to the clutches by reducing the vehicle speed or the engine speed during gear shifting to decrease the quantity of heat generated by the clutches and the gear shift shock.

However, the reduction of the vehicle speed or engine speed increases the cycle time of operation in the V-shape driving mode, which deteriorates the work efficiency. Particularly, in case of an engine of large size, the engine response is slow and response delay is large. Therefore, once the engine speed is reduced, it takes a substantial time for the engine to return to the original high speed, and thus the work efficiency is affected substantially.

The present invention has been made in view of the circumstances as described above. It is therefore an object of the present invention to alleviate the load applied to clutches of a transmission by reducing the quantity of heat generated by the clutches and the gear shift shock without inducing an increase of the cycle time or deterioration of the work efficiency.

The Patent Publication 1 mentioned in the above describes that the object of the invention is to prevent the slippage of the vehicle but does not suggest the object of the present invention in any way.

Means for Solving the Problems

A first aspect of the invention provides a gear shift control device for a work vehicle, comprising:

a transmission arranged on a power transmission path for an engine and having gear shift clutches;

an input clutch arranged between the engine and the transmission on the power transmission path for the engine;

gear shift clutch control means for selecting a gear shift clutch in response to a gear shift command to switch from a gear shift clutch used before gear shifting to the selected gear shift clutch to be used after the gear shifting to cause an engine power to be transmitted to the selected gear shift clutch of the transmission to be used after the gear shifting via the input clutch; and input clutch control means for controlling the input clutch to be switched from a connected state to a power-transmittable sliding state in a period of time from when a cut-off operation of the gear shift clutch used before the gear shifting is started to when a connecting operation of the selected gear shift clutch to be used after the gear shifting is completed.

A second aspect of the invention according to the first aspect is characterized in that each of the gear shift clutches of the transmission includes a forward clutch to cause the vehicle to travel forward and a reverse clutch to cause the vehicle to travel in reverse; and the gear shift clutch control means performs:

a control to select the forward clutch in response to the gear shift command to switch from the reverse clutch used before the gear shifting to the selected forward clutch to be used after the gear shifting; or a control to select the reverse clutch in response to the gear shift command to switch from the forward clutch used before the gear shifting to the selected reverse clutch to be used after the gear shifting.

A third aspect of the invention according to the first aspect is characterized in that the work vehicle has operating means for selecting the forward clutch or the reverse clutch according to an operating position.

A fourth aspect of the invention according to the first aspect is characterized in that a pressure detector is provided for detecting a clutch pressure of each of the gear shift clutches, and the input clutch control means performs a control to reduce a clutch pressure of the input clutch to a predetermined pressure based on a clutch pressure of the gear shift clutch used before the gear shifting and/or a clutch pressure of the selected gear shift clutch to be used after the gear shifting detected by the pressure detector.

A fifth aspect of the invention according to the first aspect is characterized in that the input clutch control means performs a control to reduce a clutch pressure of the input clutch to a predetermined pressure based on an elapsed time from a time at which a clutch chamber of the selected gear shift clutch to be used after the gear shifting is filled with pressure oil.

A sixth aspect of the invention according to the first aspect is characterized in that the input clutch control means performs a control to reduce a clutch pressure of the input clutch to a predetermined pressure based on an elapsed time from when the gear shift command is generated.

A seventh aspect of the invention according to the first aspect is characterized in that the input clutch control means performs a control to switch the input clutch from the connected state to the power-transmittable sliding state after a time when a clutch chamber of the selected gear shift clutch to be used after the gear shifting is filled with pressure oil.

An eighth aspect of the invention according to the first aspect is characterized in that the input clutch control means restores the input clutch to an original connected state from the power-transmittable sliding state after a time when a connecting operation of the selected gear shift clutch to be used after the gear shifting is completed.

A ninth aspect of the invention provides a gear shift control method for a work vehicle in which an input clutch and a transmission having gear shift clutches are arranged on a power transmission path for an engine, and one of the gear shift clutches is selected according to a gear shift command to switch from a gear shift clutch used before gear shifting to the selected gear shift clutch to be used after the gear shifting, so that an engine power is transmitted to the selected gear shift clutch of the transmission to be used after gear shifting via the input clutch, the method comprising the steps of:

(a) starting a cut-off operation of the gear shift clutch used before the gear shifting;

(b) switching the input clutch from a connected state to a power-transmittable sliding state; and (c) completing a connecting operation of the selected gear shift clutch to be used after the gear shifting.

A tenth aspect of the invention according to the ninth aspect is characterized by comprising the steps of:

(a) starting the cut-off operation of the gear shift clutch used before the gear shifting;

(b) switching the input clutch from the connected state to the power-transmittable sliding state after a time when a clutch chamber of the selected gear shift clutch to be used after the gear shifting is filled with pressure oil; and (c) completing the connecting operation of the selected gear shift clutch to be used after the gear shifting.

An eleventh aspect of the invention according to the ninth aspect is characterized by comprising the steps of:

(a) starting the cut-off operation of the gear shift clutch used before the gear shifting;

(b) switching the input clutch from the connected state to the power-transmittable sliding state;

(c) completing the connecting operation of the selected gear shift clutch to be used after the gear shifting; and (d) restoring the input clutch from the power-transmittable sliding state to an original connected state after a time when the connecting operation of the selected gear shift clutch to be used after the gear shifting is completed.

Figure 2:
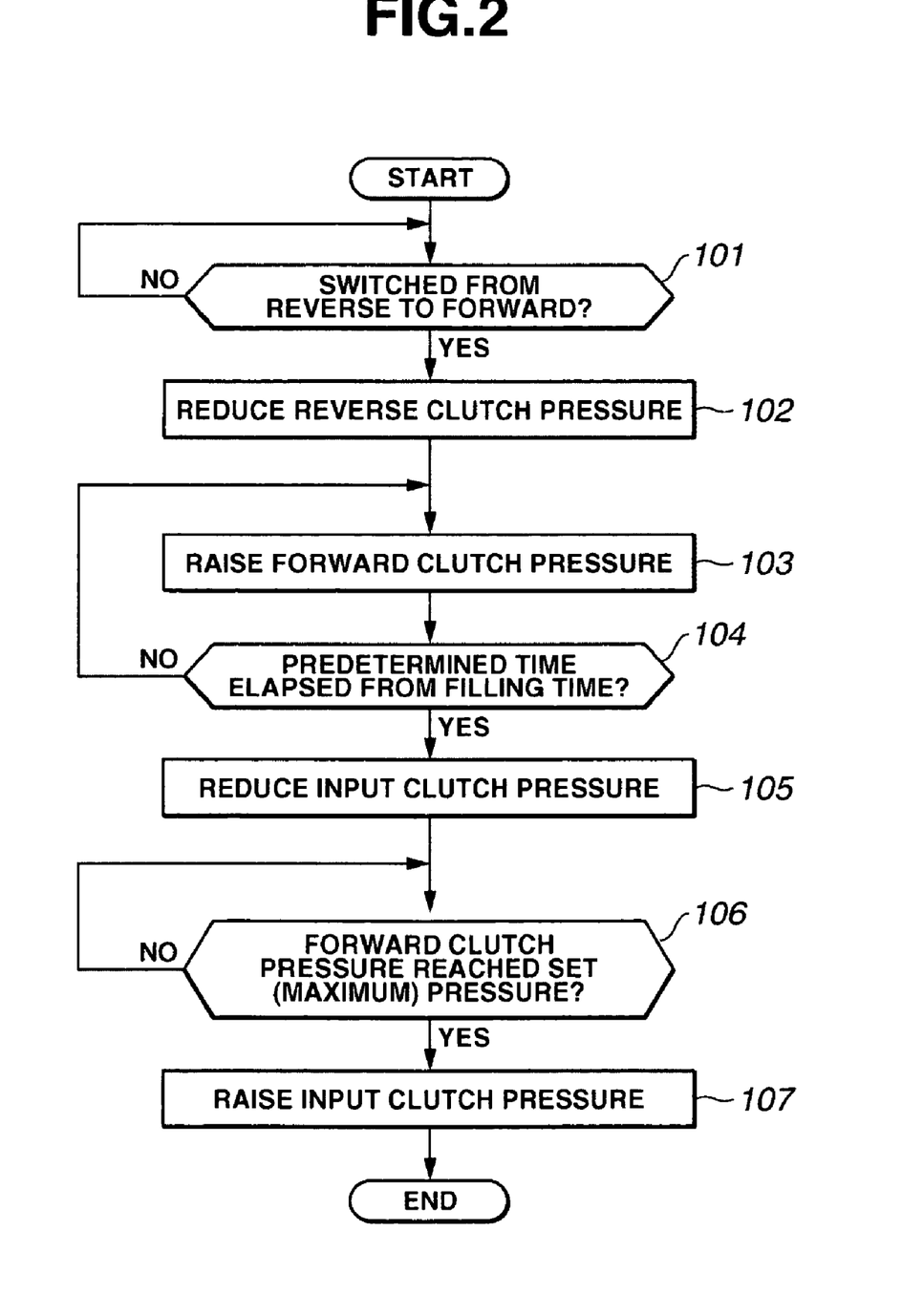
FIG. 2 is a flowchart of a gear shift control method, showing the flow of processing performed by a controller.

According to the present invention, as shown in FIGS. 6(a) to 6(c), the clutch pressure Pm of the input clutch 10 is reduced to switch from the connected state to the power-transmittable sliding state at a time tE in the period from time tA at which the operation to cut off the gear shift clutch used before gear shifting (reverse clutch 22) is started to time tD at which the operation to connect the selected gear shift clutch to be used after the gear shifting (forward clutch 21) is completed (steps 104 and 105 in FIG. 2).

According to the present invention, as shown in FIG. 6(c), the heat quantity Q generated by the forward clutch 21 and reverse clutch 22 during gear shifting is reduced in comparison with the comparison example by the extent indicated by a cross-hatched region r, and the load applied to the forward clutch 21 and reverse clutch 22 is also reduced by that extent. This is because the input clutch 10 is in the power-transmittable sliding state during gear shifting so that a part of the load on the forward clutch 21 and reverse clutch 22 is shared by the input clutch 10 and the heat quantity Q indicated by the cross-hatched region s corresponding to the cross-hatched region r is generated in the input clutch 10.

Additionally, since the input clutch 10 is in the power-transmittable sliding state during gear shifting, the torque variation is also reduced when the clutch input side is connected (engaged) with the clutch output side of the selected forward clutch 21 to be used after the shifting, and thus gear shift shock is reduced.

Therefore, even if gear shifting is performed without lowering the vehicle speed and with the engine speed kept high, the load applied to the gear shift clutches 21 and 22 of the transmission 20 is decreased. This retards the progress of the wear in the clutches and prolongs the cycle to disassemble the interior of the transmission 20 to replace the clutches 21 and 22. As a result, the burden of the work to replace the clutch 21 and 22 of the transmission 20 can be mitigated. Moreover, the work to replace the input clutch 10 or the like can be performed easily because there is no need of disassembling the transmission 20.

According to the present invention, therefore, the heat quantity generated by the gear shift clutches 21 and 22 of the transmission 20 and the gear shift shock can be reduced and the load on the clutches can be alleviated even if gear shifting is performed without reducing the vehicle speed and with the engine speed kept high. Thus, the gear shifting is possible without inducing prolongation of the cycle time or deterioration of the work efficiency.

BEST MODE FOR CARRYING OUT THE INVENTION

Embodiments of the present invention will be described below with reference to the drawings.

Figure 1:
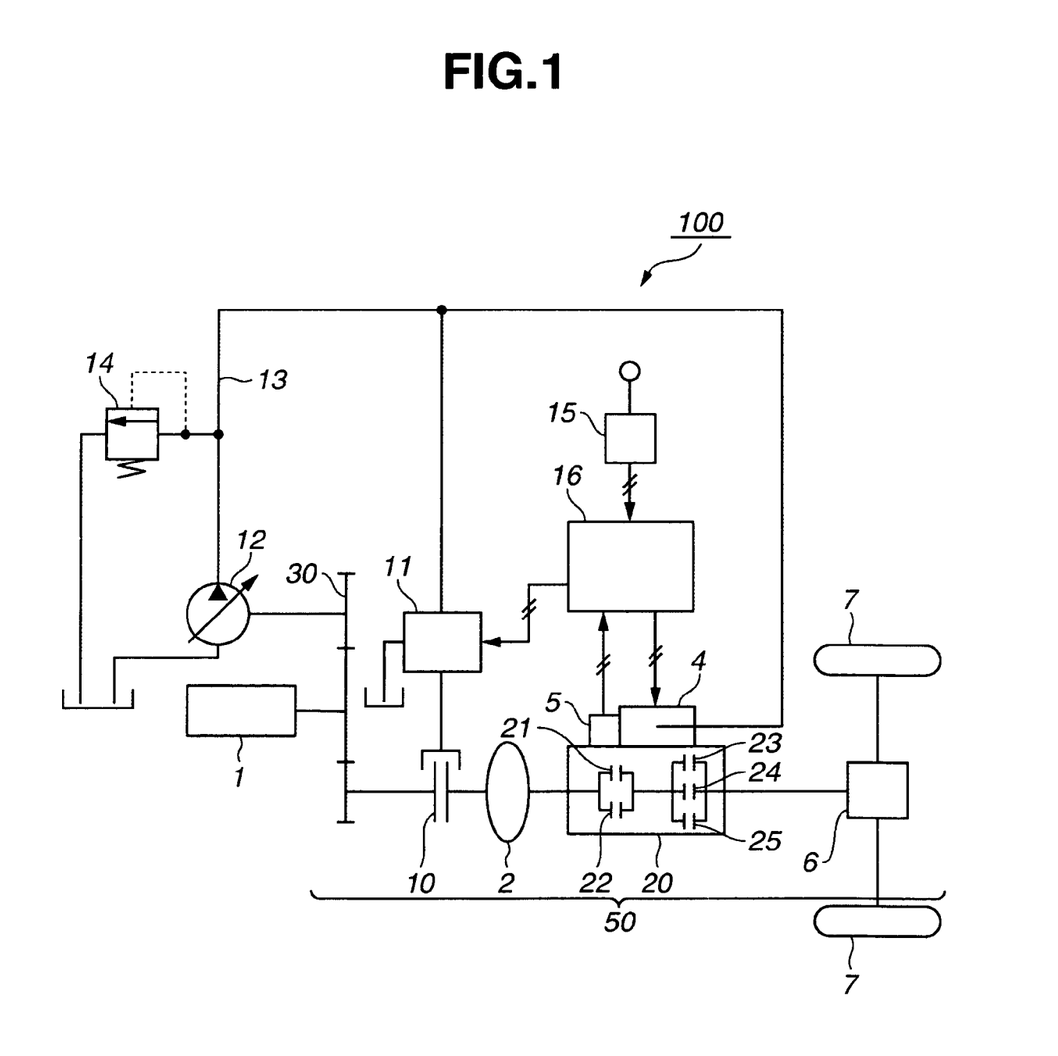
FIG. 1 is a block diagram of a transmission control device for a work vehicle according to an embodiment, showing a part of a configuration of a wheel loader relating to the present invention.

FIG. 1 is a block diagram of a transmission control device for a work vehicle according to an embodiment, showing a part of configuration of a wheel loader relating to the present invention.

As shown in FIG. 1, a power transmission path 50 for an engine 1 of a wheel loader 100 is provided with a transmission 20 having a forward clutch 21 and a reverse clutch 22.

In the power transmission path 50 for the engine of the wheel loader 100, an input clutch (modulation clutch) 10 is arranged between the engine 1 and the transmission 20.

The output shaft of the engine 1 of the wheel loader 100 is connected to a PTO shaft 30. The PTO shaft 30 is connected to the input clutch 10 and also to a hydraulic pump 12.

Output of the engine 1 is transmitted to drive wheels 7 through the input clutch 10, a torque converter 2, the transmission 20, and a speed-reducing device (differential gear) 6. The input clutch 10 is a wet multiplate hydraulic clutch.

The transmission 20 has gear shift clutches which are wet multiplate hydraulic clutches. The gear shift clutches of the transmission 20 are composed of a forward clutch 21, a reverse clutch 22, and gear clutches, namely a first-gear clutch 23, a second-gear clutch 24, and a third-gear clutch 25.

The frictional engagement force between the input side and the output side of the gear shift clutches 21 to 25 is controlled by controlling a hydraulic pressure (clutch pressure) Pt of pressure oil supplied to or discharged from the gear shift clutches 21 to 25. Similarly, the frictional engagement force between the input side and the output side of the input clutch 10 is controlled by controlling a clutch pressure Pm of pressure oil supplied to or discharged from the input clutch 10.

A forward/reverse switch lever 15 is provided in a driver seat of the wheel loader 100 to serve as operating means for selecting either the forward clutch 21 or the reverse clutch 22 depending on an operating position.

A gear shift command signal indicating an operating position (forward position or reverse position) of the forward/reverse switch lever 15 is input to a controller 16.

The transmission 20 has a pressure detector 5 for detecting clutch pressures Pt of the gear shift clutches 21 to 25. The pressure detector 5 includes a fill sensor detecting a fill signal to be described later, and a pressure sensor. The clutch pressures Pt of the gear shift clutches 21 to 25 detected by the pressure detector 5 are input to the controller 16.

The transmission 20 has a gear shift clutch control valve 4 for controlling the connection and cut-off operation of the gear shift clutches 21 to 25.

The input clutch 10 has an input clutch control valve 11 for controlling the connection and cut-off operation of the input clutch 10.

A discharge passage 13 of the hydraulic pump 12 communicates with the gear shift clutch control valve 4 and the input clutch control valve 11. The discharge passage 13 is provided with a relief valve 14. The gear shift clutch control valve 4 is a servo valve which receives hydraulic oil discharged from the hydraulic pump 12 and controls the supply of the hydraulic oil to the gear shift clutches 21 to 25 and the discharge of the hydraulic oil from the gear shift clutches 21 to 25 according to the clutch pressure command signal. Similarly, the input clutch control valve 11 is a servo valve which receives hydraulic oil discharged from the hydraulic pump 12 and controls the supply of the hydraulic oil to the input clutch 10 and the discharge of the hydraulic oil from the input clutch 10 according to the clutch pressure command signal.

When the clutch chamber of the forward clutch 21 or the reverse clutch 22 is filled with pressure oil (when the filling is completed), the fill sensor detects the completion of filling, and the gear shift clutch control valve 4 outputs a fill signal indicating the completion of filling to the controller 16.

The controller 16, which serves as gear shift clutch control means and input clutch control means, outputs a clutch pressure command signal to the gear shift clutch control valve 4 and also outputs a clutch pressure command signal to the input clutch control valve 11, as described later. The clutch pressure command signal is a time varying pattern of the clutch pressure Pt. The clutch pressures Pt corresponding to the respective times are preliminarily stored in the memory.

For example, the forward clutch 21 is selected when the controller 16 receives a gear shift command signal for switching from reverse travel to forward travel while the wheel loader 100 is traveling in reverse. The controller 16 outputs a clutch pressure command signal to reduce the clutch pressure Pt of the reverse clutch 22 used before gear shifting according to a predetermined hydraulic pressure variation pattern. In the meantime, the controller 16 raises the clutch pressure Pt of the selected forward clutch 21 to be used after the gear shifting to switch from the reverse clutch 22 to the forward clutch 21. Thereby, the power of the engine 1 is transmitted to the drive wheels 7 via the input clutch 10, the torque converter 2, the selected forward clutch 21 to be used after the gear shifting of the transmission 20, and the speed-reducing gear 6 to drive the drive wheels 7. Thus, the wheel loader 100 is switched from reverse travel to forward travel.

First Embodiment

FIG. 2 is a flowchart of a gear shift control method according to a first embodiment, illustrating the flow of processing performed by the controller 16.

FIG. 6(a) illustrates a correlation between a time t and a clutch pressure Pt of the forward clutch 21 and the reverse clutch 22.

FIG. 6(b) illustrates time variation of the clutch pressure Pm of the input clutch 10, using the abscissa axis, or the time axis of FIG. 6(a) in common.

FIG. 6(c) illustrates time variation of the heat quantities Q generated by the forward clutch 21, the reverse clutch 22, and the input clutch 10, using the abscissa axis, or the time axis of FIG. 6(a) in common.

Figure 6:
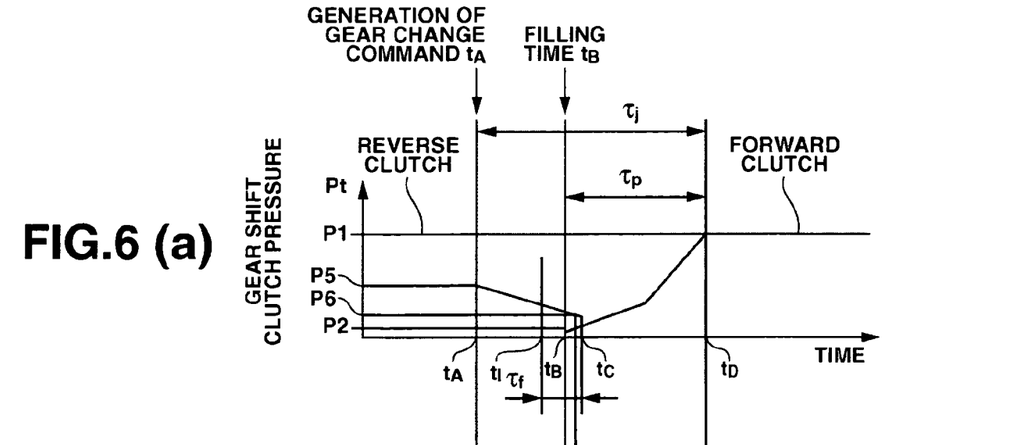
FIG. 6(a) is a diagram showing correlation between time and clutch pressures of the forward and reverse clutches.
FIG. 6(b) is a diagram showing time variation of the clutch pressure of the input clutch while using the abscissa axis of FIG. 6(a) in common as the time axis.
FIG. 6(c) is a diagram showing time variation of the heat quantities generated in the forward clutch, reverse clutch, and input clutch while using the abscissa axis of FIG. 6(a) in common as the time axis.

A following description will be made, with reference to FIG. 2 and FIG. 6 together, on the assumption of a case in which the forward/reverse switch lever 15 is operated to the forward position while the wheel loader 100 is traveling in reverse, for example.

The controller 16 determines, based on a gear shift command signal input thereto, whether or not the forward/reverse switch lever 15 has been operated to switch from the reverse position to the forward position (step 101).

If the forward/reverse switch lever 15 has been operated to switch from the reverse position to the forward position (determined YES in step 101), a clutch pressure command signal for switching from reverse travel to forward travel is generated and output to the gear shift clutch control valve 4.

The gear shift clutch control valve 4 starts a clutch cut-off operation at a time tA to rapidly reduce the clutch pressure Pt of the reverse clutch 22 from a pressure P1 at which a completely connected state is established to a predetermined pressure P5 at which a sliding state is established. Thereafter, the clutch pressure Pt is gradually reduced until reaching a pressure to establish a completely cut state, or a pressure of substantially zero, at a time tc (step 102).

Subsequently, according to the clutch pressure command signal (time varying pattern of the clutch pressure), the gear shift clutch control valve 4 starts supplying hydraulic oil to the forward clutch 21 to fill the clutch chamber therewith, at a time tI that is earlier than time tc at which the clutch pressure Pt of the reverse clutch 22 becomes substantially zero, by a minute time period τf. When the clutch chamber of the forward clutch 21 is filled with the pressure oil (the filling is completed) at a time tB, a fill signal is input to the controller 16 by the fill sensor detecting this. Upon receiving the fill signal at the filling time tB, the controller 16 then gradually increases (builds up) the clutch pressure Pt from the pressure P2 at the completion of filling to the set pressure P1 to establish the completely connected state. The clutch pressure Pt of the forward clutch 21 reaches the set pressure P1 at which the completely connected state is established, at a time tD (step 103).

The controller 16 performs control to reduce the clutch pressure Pm of the input clutch 10 to a predetermined pressure P4 at which a power-transmittable sliding state is established, based on an elapsed time τg from the filling time tB at which the clutch chamber of the selected forward clutch 21 to be used after the gear shifting is filled with the pressure oil.

This means that the controller 16 determines whether or not a predetermined time period τg has elapsed from the filling time tB (step 104).

If it is determined that the predetermined time period τg has elapsed from the filling time tB (determined YES in step 104), the clutch pressure Pm of the input clutch 10 is reduced at a time tE from the set pressure P3 at which the completely connected state is established to a predetermined pressure P4 at which the power-transmittable sliding state is established. This pressure P4 is maintained after that (step 105).

The controller 16 determines, based on a detection signal from the pressure detector 5, whether or not the clutch pressure Pt of the selected forward clutch 21 to be used after the gear shifting has reached the set pressure (maximum pressure) P1 at which the completely connected state is established (step 106).

If it is determined at the time tD that the clutch pressure Pt of the forward clutch 21 has reached the set pressure (maximum pressure) P1 at which the completely connected state is established (determined YES in step 106), the clutch pressure Pm of the input clutch 10 is raised from the pressure P4 to the original set pressure P3 at the time tF after elapse of a predetermined time period τh (step 107).

A description will now be made on the time variation of the heat quantity Q generated during the gear shift control described above.

The line k in FIG. 6(c) indicates a time variation of the heat quantity Q generated by the forward clutch 21 and the reverse clutch 22 when the control is performed to reduce the clutch pressure Pm of the input clutch 10 according to the present embodiment as shown in FIG. 6(b). The line m in FIG. 6(c) indicates, as a comparison example with the embodiment, a time variation of the heat quantity Q generated by the forward clutch 21 and the reverse clutch 22 when the control of the present embodiment is not performed (when the clutch pressure Pm of the input clutch 10 is kept at the set pressure P3). The line n in FIG. 6(c) indicates a time variation of the heat quantity Q generated by the input clutch 10 when the control of the embodiment is performed.

As shown in FIG. 6(c), according to the present embodiment, the heat quantity Q generated by the forward clutch 21 and the reverse clutch 22 during gear shifting is smaller than the comparison example by the extent indicated by the cross-hatched region r, and the load on the forward clutch 21 and the reverse clutch 22 is reduced by that extent. This is because the input clutch 10 is in the power-transmittable sliding state during the gear shifting, whereby the load on the forward clutch 21 and the reverse clutch 22 is partially shared by the input clutch 10, and the heat quantity Q indicated by the cross-hatched region s corresponding to the cross-hatched region r is generated by the input clutch 10.

Additionally, since the input clutch 10 is in the power-transmittable sliding state during the gear shifting, the variation in torque is reduced when the clutch input side and the clutch output side of the selected forward clutch 21 to be used after gear shift are connected (engaged) with each other, and hence the gear shift shock is also reduced.

Accordingly, even if the gear shifting is performed without reducing the vehicle speed and with the engine speed kept high, the load applied to the gear shift clutches 21 and 22 of the transmission 20 can be reduced to retard the progress of the wear of the clutches, and thus the cycle to disassemble the interior of the transmission 20 to replace the clutches 21 and 22 can be made longer. This makes it possible to alleviate the burden of work to replace the clutches 21 and 22 of the transmission 20 or the like. The replacement of the input clutch 10 can be performed easily because there is no need of disassembling the transmission 20.

According to the present embodiment, as described above, even if the gear shifting is performed without reducing the vehicle speed and with the engine speed kept high, the heat quantity generated by the gear shift clutches 21 and 22 of the transmission 20 and the gear shift shock can be reduced, and thus the load on the clutches can be reduced. Therefore, it is possible to prevent the prolongation of the cycle time and deterioration of the work efficiency.

Second Embodiment

The first embodiment described above can be modified in various manners.

In the first embodiment above, the clutch pressure Pm of the input clutch 10 is reduced (step 105) if it is determined that the predetermined time period τg has elapsed from the filling time tB (determined YES in step 104). This determination may be performed by the pressure detector 5.

Figure 3:
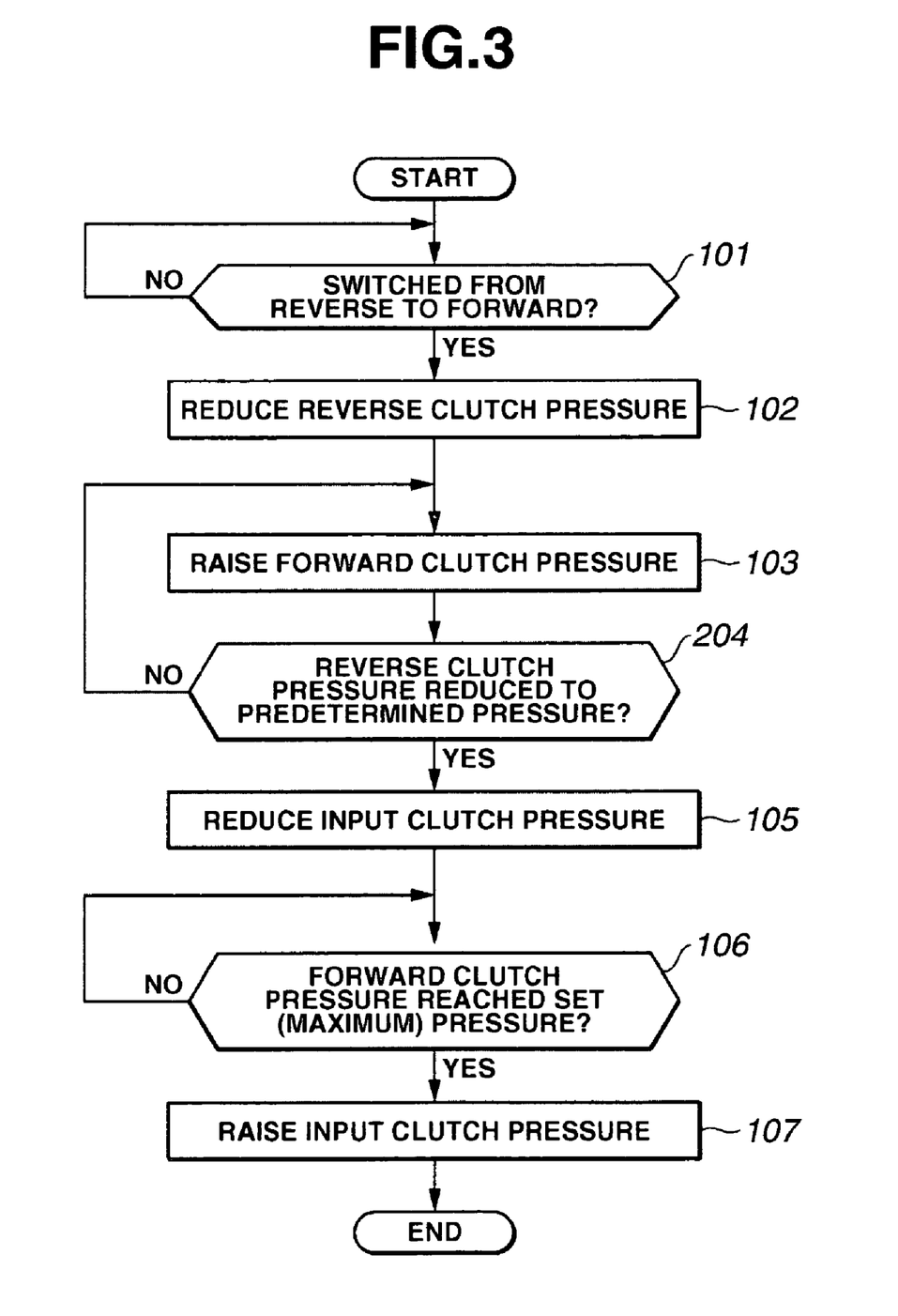
FIG. 3 is a flowchart corresponding to FIG. 2, but showing the flow of processing according to another embodiment.

Specifically, as shown in FIG. 3, it can be determined that the predetermined time period τg has elapsed from the filling time tB based on the fact that the clutch pressure Pt of the reverse clutch 22 used before gear shifting detected by the pressure detector 5 has reached a predetermined pressure P6 (FIG. 6(a)) (determined YES in step 204), and the clutch pressure Pm of the input clutch 10 may be decreased (step 105).

Third Embodiment

According to the first embodiment described above, if it is determined at the time tD that the clutch pressure Pt of the forward clutch 21 has reached the set pressure (maximum pressure) P1 at which the completely connected state is established (determined YES in step 106), the clutch pressure Pm of the input clutch 10 is raised from the pressure P4 to the original set pressure P3 after elapse of the predetermined time period τh (step 107). This determination may be performed only by time management without using the pressure sensor.

Figure 4:
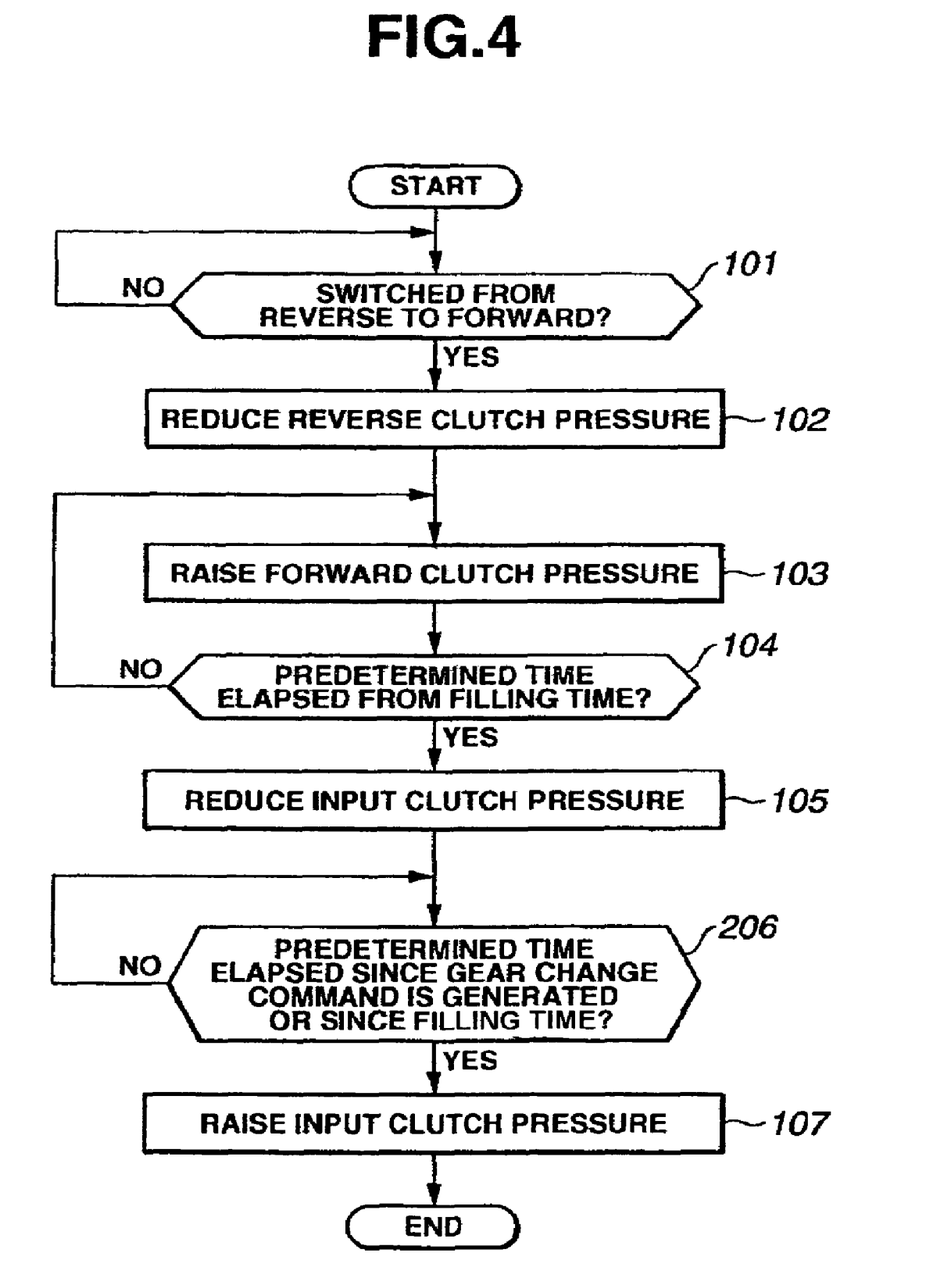
FIG. 4 is a flowchart corresponding to FIG. 2, but showing the flow of processing according to another embodiment.

Specifically, as shown in FIG. 4, it may be determined at the time tD that the pressure has reached the set pressure (maximum pressure) P1 at which the completely connected state is established based on the fact that the predetermined time period τj has elapsed since the gear shift command is generated (FIG. 6(a)), or the predetermined time period τp has elapsed from the filling time tB (FIG. 6(a)) (determined YES in step 206), and the clutch pressure Pm of the input clutch 10 may be raised from the pressure P4 to the original set pressure P3 after elapse of the predetermined time period τh (step 107).

According to the third embodiment, there is no need of using the pressure sensor to detect the clutch pressure Pt of the forward clutch 21 and the reverse clutch 22. Therefore, the pressure sensor can be omitted from the arrangement.

Fourth Embodiment

Figure 5:
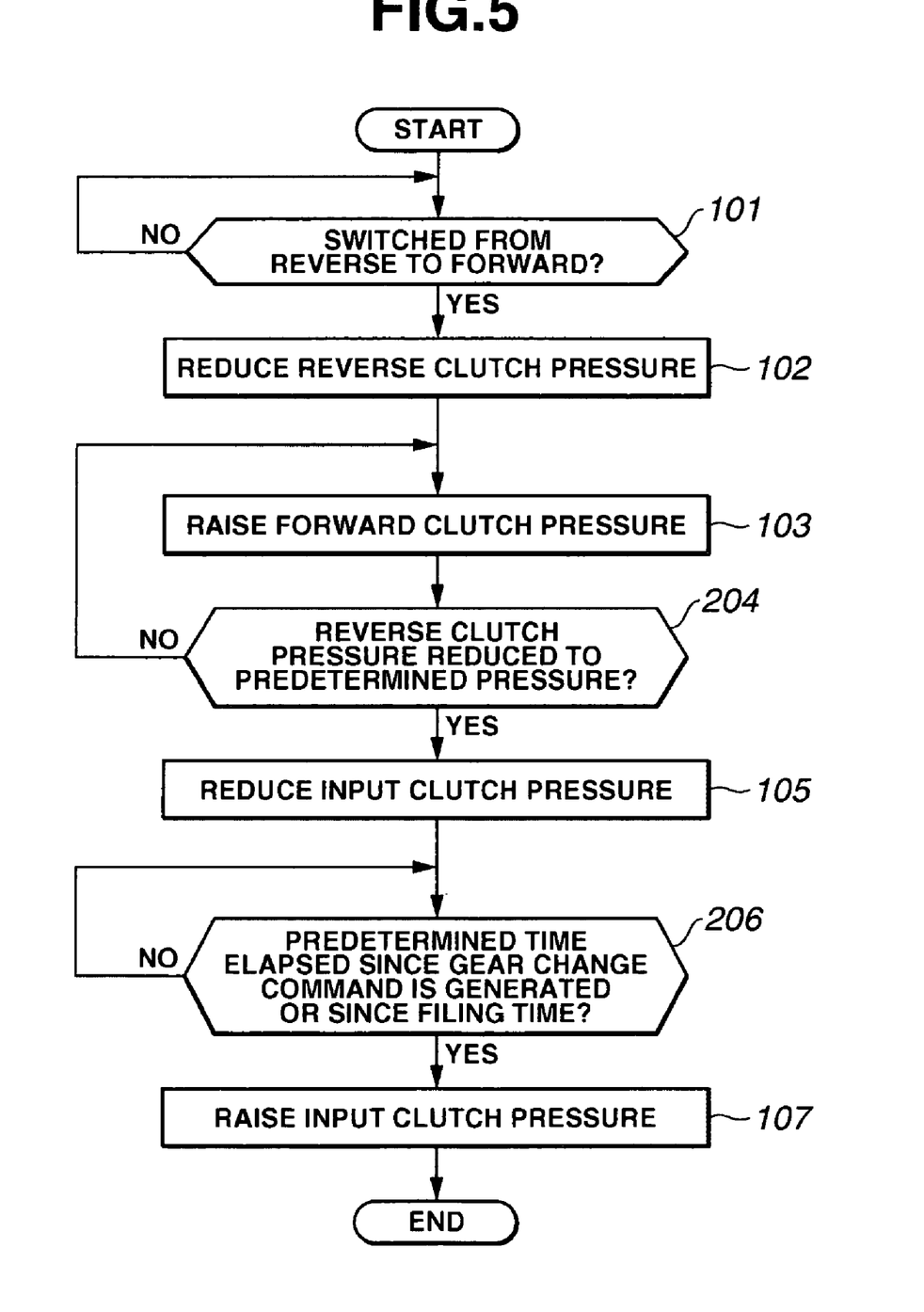
FIG. 5 is a flowchart corresponding to FIG. 2, but showing the flow of processing according to another embodiment.

Similarly, as shown in FIG. 5, it may be determined that a predetermined time period τg has elapsed from the filling time tB based on the fact that the clutch pressure Pt of the reverse clutch 22 used before gear shifting detected by the pressure detector 5 has reached the predetermined pressure P6 (FIG. 6(a)) (determined YES in step 204), and the clutch pressure Pm of the input clutch 10 may be decreased (step 105). It may be determined at the time tD that the pressure has reached the set pressure (maximum pressure) P1 at which the completely connected state is established, based on the fact the predetermined time period τj has elapsed since the gear shift command is generated (FIG. 6(a)), or the predetermined time period τp has elapsed from the filling time tB (FIG. 6(a)) (determined YES in step 206), and the clutch pressure Pm of the input clutch 10 may be raised from the pressure P4 to the original set pressure P3 after elapse of the predetermined time period τh (step 107).

Fifth Embodiment

According to the embodiments described above, the clutch pressure Pm of the input clutch 10 is reduced to switch from the connected state to the power-transmittable sliding state at the time tE after the filling time tB at which the clutch chamber of the selected forward clutch 21 to be used after the gear shifting is filled with the pressure oil (step 104,105), and then the clutch pressure Pm of the input clutch 10 is raised to restore the original connected state from the power-transmittable sliding state, at a time tF after the time tD at which the connecting operation of the selected forward clutch 21 to be used after the gear shifting is completed (steps 106 and 107). However, the timing to reduce or raise the clutch pressure Pm of the input clutch 10 is not limited to this. The timing to reduce the clutch pressure Pm of the input clutch 10 may be set at any time during the period from when the cut-off operation of the reverse clutch 22 used before gear shifting is started at the time tA to when the connecting operation of the selected forward clutch 21 to be used after the gear shifting is completed at the time tD.

Figure 7:
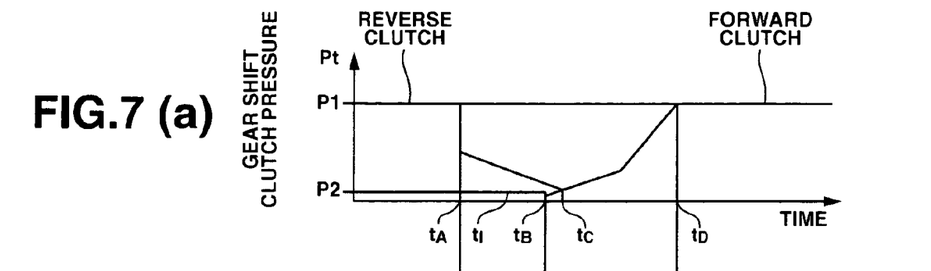
FIGS. 7(a) and 7(b) are diagrams for explaining another embodiment, and correspond to FIGS. 6(a) and 6(b), respectively.

FIGS. 7(a) and 7(b) are diagrams corresponding to FIGS. 6(a) and 6(b), respectively, and illustrate the timings to reduce and raise the clutch pressure of the input clutch 10 according to the fifth embodiment.

As shown in FIGS. 7(a) and 7(b), the clutch pressure Pm of the input clutch 10 may be reduced at the time tA when the cut-off operation of the reverse clutch 22 is started (at a time before the filling time tB at which the clutch chamber of the selected forward clutch 21 to be used after the gear shifting is filled with the pressure oil), and the clutch pressure Pm of the input clutch 10 may be raised after time tD when the connecting operation of the forward clutch 21 is completed.

Sixth Embodiment

Figure 8:
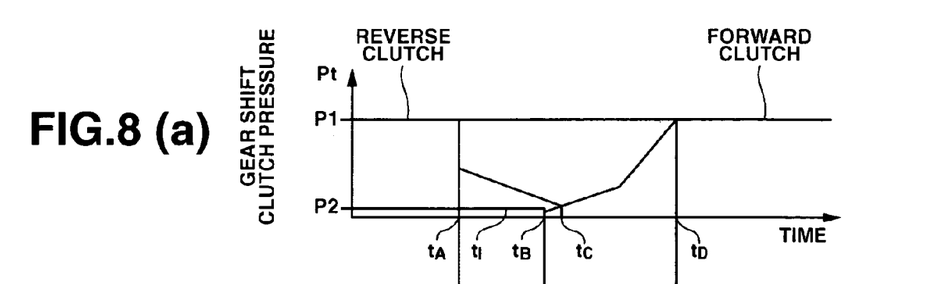
FIGS. 8(a) and 8(b) are diagrams for explaining another embodiment, and correspond to FIGS. 6(a) and 6(b), respectively.

FIGS. 8(a) and 8(b) are diagrams corresponding to FIGS. 6(a) and 6(b), respectively, and illustrate the timings to reduce and raise the clutch pressure of the input clutch 10 according to the sixth embodiment.

As shown in FIGS. 8(a) and 8(b), the clutch pressure Pm of the input clutch 10 may be reduced at a time after the filling time tB at which the clutch chamber of the selected forward clutch 21 to be used after the gear shifting is filled with the pressure oil, and raised at a time tu before the time tD at which the connecting operation of the forward clutch 21 is completed.

Seventh Embodiment

Figure 9:
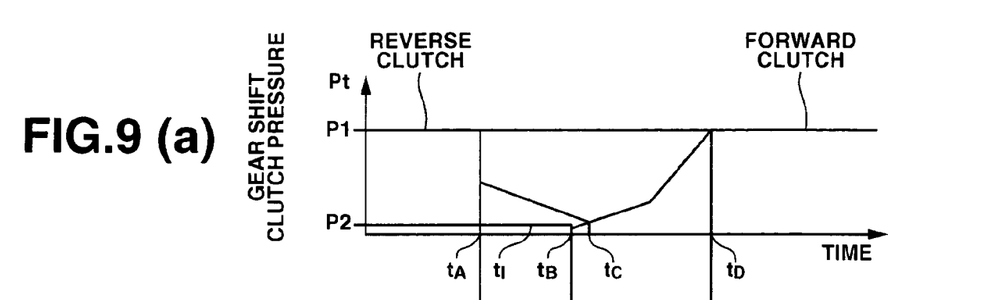
FIGS. 9(a) and 9(b) are diagrams for explaining another embodiment, and correspond to FIGS. 6(a) and 6(b), respectively.

FIGS. 9(a) and 9(b) are diagrams corresponding to FIGS. 6(a) and 6(b), respectively, and illustrate the timings to reduce and raise the clutch pressure of the input clutch 10 according to the seventh embodiment.

As shown in FIGS. 9(a) and 9(b), the clutch pressure Pm of the input clutch 10 may be reduced at a time before the time tA at which the cut-off operation of the reverse clutch 22 is started (at a time before the filling time tB when the clutch chamber of the selected forward clutch 21 to be used after the gear shifting is filled with the pressure oil), and the clutch pressure Pm of the input clutch 10 may be raised at a time tu before the time tD at which the connecting operation of the forward clutch 21 is completed.

The description of the embodiments above has been made in terms of the case where the forward/reverse switch lever 15 is operated to the forward position while the wheel loader 100 is traveling in reverse, that is, when the gear shift clutch used before gear shifting is the reverse clutch 22 and the selected gear shift clutch to be used after the gear shifting is the forward clutch 21. However, the present invention is similarly applicable to the case in which the forward/reverse switch lever 15 is operated to the reverse position while the wheel loader 100 is traveling forward, substituting the reverse clutch 22 as the gear shift clutch used before gear shifting according to the embodiments above with the forward clutch 21 and substituting the forward clutch 21 as the gear shift clutch to be used after the gear shifting according to the embodiments above with the reverse clutch 22.

Further, the description of the embodiments described above has been made on the assumption of the case in which the switching is conducted from the forward clutch 21 to the reverse clutch 22. However, the present invention is similarly applicable to the case in which the switching is conducted to any other gear clutch forming the transmission 20.

Specifically, the present invention is similarly applicable by substituting the switching from the reverse clutch 21 to the forward clutch 22 according to the embodiments with the switching from the first-gear clutch 23 to the second-gear clutch 24, the switching from the first-gear clutch 23 to the third-gear clutch 25, the switching from the second-gear clutch 24 to the third-gear clutch 25, the switching from the second-gear clutch 24 to the first-gear clutch 23, the switching from the third-gear clutch 25 to the first-gear clutch 23, or the switching from the third-gear clutch 25 to the second-gear clutch 24.

Although the description of the embodiments has been made on the assumption that the work vehicle is a wheel loader, the present invention is similarly applicable to any other work vehicle as long as the work vehicle has an input clutch (modulation clutch) in addition to the gear shift clutches of the transmission.

The invention claimed is:

1. A gear shift control device for a work vehicle in which an output shaft of an engine is connected to an input clutch that is arranged between the engine and a transmission, the gear shift control device being operable to control the transmission that includes gear shift clutches and is arranged on a power transmission path for the engine, the gear shift control device comprising:

gear shift clutch control means for selecting a gear shift clutch in response to a gear shift command to switch from a gear shift clutch used before gear shifting to the selected gear shift clutch to be used after the gear shifting to cause engine power to be transmitted to the selected gear shift clutch of the transmission to be used after the gear shifting via the input clutch; and input clutch control means for controlling the input clutch so as to start a cut-off operation in a period of time from when a cut-off operation of the gear shift clutch used before the gear shifting is started to when a connecting operation of the selected gear shift clutch to be used after the gear shifting is completed, switching the input clutch from the connected state to a power transmittable sliding state, and maintaining the sliding state at least until the connecting operation of the gear shift clutch to be used after the gear shifting is completed.

2. The gear shift control device for a work vehicle according to claim 1, wherein each of the gear shift clutches of the transmission includes a forward clutch to cause the vehicle to travel forward and a reverse clutch to cause the vehicle to travel in reverse; and the gear shift clutch control means performs:

a control to select the forward clutch in response to the gear shift command to switch from the reverse clutch used before the gear shifting to the selected forward clutch to be used after the gear shifting; or a control to select the reverse clutch in response to the gear shift command to switch from the forward clutch used before the gear shifting to the selected reverse clutch to be used after the gear shifting.

3. The gear shift control device for a work vehicle according to claim 1, wherein the work vehicle has operating means for selecting the forward clutch or the reverse clutch according to an operating position and the gear shift clutch control means receives a gear shift command signal indicating whether the operating means has been operated to select either the forward clutch or the reverse clutch.

4. A gear shift control device for a work vehicle in which an output shaft of an engine is connected to an input clutch that is arranged between the engine and a transmission, the gear shift control device being operable to control the transmission that includes gear shift clutches and is arranged on a power transmission path for the engine, the gear shift control device comprising:

gear shift clutch controls means for selecting a gear shift clutch in response to a gear shift command to switch from a gear shift clutch used before gear shifting to the selected gear shift clutch to be used after the gear shifting to cause engine power to be transmitted to the selected gear shift clutch of the transmission to be used after the gear shifting via the input clutch;

input clutch control means for controlling the input clutch so as to start a cut-off operation of the input clutch in a period of time from when a cut-off operation of the gear shift clutch used before the gear shifting is started to when a connecting operation of the selected gear shift clutch to be used after the gear shifting is completed, switching the input clutch from the connected state to a power transmittable sliding state, and maintaining the sliding state at least until the connecting operation of the gear shift clutch to be used after the gear shifting is completed; and a pressure detector for detecting a clutch pressure of each of the gear shift clutches, wherein the input clutch control means performs a control to reduce a clutch pressure of the input clutch to a predetermined pressure based on a clutch pressure of the gear shift clutch used before the gear shifting and/or a clutch pressure of the selected gear shift clutch to be used after the gear shifting detected by the pressure detector.

5. A gear shift control device for a work vehicle in which an output shaft of an engine is connected to an input clutch that is arranged between the engine and a transmission, the gear shift control device being operable to control the transmission that includes gear shift clutches and is arranged on a power transmission path for the engine, the gear shift control device comprising:

gear shift clutch controls means for selecting a gear shift clutch in response to a gear shift command to switch from a gear shift clutch used before gear shifting to the selected gear shift clutch to be used after the gear shifting to cause engine power to be transmitted to the selected gear shift clutch of the transmission to be used after the gear shifting via the input clutch;

input clutch control means for controlling the input clutch so as to start a cut-off operation of the input clutch in a period of time from when a cut-off operation of the gear shift clutch used before the gear shifting is started to when a connecting operation of the selected gear shift clutch to be used after the gear shifting is completed, switching the input clutch from the connected state to a power transmittable sliding state, and maintaining the sliding state at least until the connecting operation of the gear shift clutch to be used after the gear shifting is completed, wherein the input clutch control means performs a control to reduce a clutch pressure of the input clutch to a predetermined pressure based on an elapsed time from a time at which a clutch chamber of the selected gear shift clutch to be used after the gear shifting is filled with pressure oil.

6. The gear shift control device for a work vehicle according to claim 1, wherein the input clutch control means performs a control to reduce a clutch pressure of the input clutch to a predetermined pressure based on an elapsed time from when the gear shift command is generated.

7. A gear shift control device for a work vehicle in which an output shaft of an engine is connected to an input clutch that is arranged between the engine and a transmission, the gear shift control device being operable to control the transmission that includes gear shift clutches and is arranged on a power transmission path for the engine, the gear shift control device comprising:

gear shift clutch controls means for selecting a gear shift clutch in response to a gear shift command to switch from a gear shift clutch used before gear shifting to the selected gear shift clutch to be used after the gear shifting to cause engine power to be transmitted to the selected gear shift clutch of the transmission to be used after the gear shifting via the input clutch;

input clutch control means for controlling the input clutch so as to start a cut-off operation of the input clutch in a period of time from when a cut-off operation of the gear shift clutch used before the gear shifting is started to when a connecting operation of the selected gear shift clutch to be used after the gear shifting is completed, switching the input clutch from the connected state to a power transmittable sliding state, and maintaining the sliding state at least until the connecting operation of the gear shift clutch to be used after the gear shifting is completed, wherein the input clutch control means performs a control to switch the input clutch from the connected state to the power-transmittable sliding state after a time when a clutch chamber of the selected gear shift clutch to be used after the gear shifting is filled with pressure oil.

8. The gear shift control device for a work vehicle according to claim 1, wherein the input clutch control means restores the input clutch to an original connected state from the power-transmittable sliding state after a time when a connecting operation of the selected gear shift clutch to be used after the gear shifting is completed.

9. A gear shift control method for a work vehicle in which an output shaft of an engine of the work vehicle is connected to an input clutch, the input clutch and a transmission having gear shift clutches are arranged on a power transmission path for the engine, and one of the gear shift clutches is selected according to a gear shift command to switch from a gear shift clutch used before the gear shifting to the selected gear shift clutch to be used after the gear shifting, so that engine power is transmitted to the selected gear shift clutch of the transmission to be used after the gear shifting via the input clutch, the method comprising the steps of:

(a) starting a cut-off operation of the gear shift clutch used before the gear shifting;

(b) starting a cut-off operation of the input clutch to switch the input clutch from a connected state to a power-transmittable sliding state;

(c) maintaining the sliding state at least until the connecting operation of the gear shift clutch to be used after the gear shifting is completed; and (d) completing a connecting operation of the selected gear shift clutch to be used after the gear shifting.

10. The gear shift control method for a work vehicle according to claim 9, comprising the steps of:

(a) starting the cut-off operation of the gear shift clutch used before the gear shifting;

(b) starting a cut-off operation of the input clutch to switch the input clutch from the connected state to the power-transmittable sliding state after a time when a clutch chamber of the selected gear shift clutch to be used after the gear shifting is filled with pressure oil;

(c) maintaining the sliding state at least until the connecting operation of the gear shift clutch to be used after the gear shifting is completed; and (d) completing the connecting operation of the selected gear shift clutch to be used after the gear shifting.

11. The gear shift control method for a work vehicle according to claim 9, comprising the steps of:

(a) starting the cut-off operation of the gear shift clutch used before the gear shifting;

(b) starting a cut-off operation of the input clutch to switch the input clutch from the connected state to the power-transmittable sliding state;

(c) maintaining the sliding state of the input clutch;

(d) completing the connecting operation of the selected gear shift clutch to be used after the gear shifting; and (e) restoring the input clutch from the power-transmittable sliding state to an original connected state after a time when the connecting operation of the selected gear shift clutch to be used after the gear shifting is completed.

* * * * *